US012452581B2

(12) United States Patent
Ren et al.

(10) Patent No.: US 12,452,581 B2
(45) Date of Patent: Oct. 21, 2025

(54) EARPHONE CORE AND EARPHONE

(71) Applicant: AAC Microtech (Changzhou) Co., Ltd., Changzhou (CN)

(72) Inventors: Zhang Ren, Shenzhen (CN); Zhiwei Zhong, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/914,365

(22) PCT Filed: Jul. 20, 2022

(86) PCT No.: PCT/CN2022/106750

§ 371 (c)(1),
(2) Date: Jan. 4, 2024

(87) PCT Pub. No.: WO2024/000689

PCT Pub. Date: Jan. 4, 2024

(65) Prior Publication Data

US 2024/0223938 A1 Jul. 4, 2024

(30) Foreign Application Priority Data

Jun. 30, 2022 (CN) ......................... 202221689854.1

(51) Int. Cl.
*H04R 1/10* (2006.01)
*H04R 1/28* (2006.01)
(Continued)

(52) U.S. Cl.
CPC ............. *H04R 1/2811* (2013.01); *H04R 1/10* (2013.01); *H04R 1/1016* (2013.01); *H04R 1/1075* (2013.01); *H04R 7/18* (2013.01); *H04R 9/025* (2013.01); *H04R 9/06* (2013.01); *H04R 2209/026* (2013.01); *H04R 2499/11* (2013.01)

(58) Field of Classification Search
CPC ...... H04R 1/10; H04R 1/1016; H04R 1/1075; H04R 1/24; H04R 1/2811; H04R 7/18; H04R 9/02; H04R 9/025; H04R 9/06; H04R 2209/026; H04R 2499/11
See application file for complete search history.

(56) References Cited

U.S. PATENT DOCUMENTS

| | | | | |
|---|---|---|---|---|
| 6,744,895 B2 * | 6/2004 | Miyamoto | H04R 9/10 381/342 |
| 2013/0016867 A1 * | 1/2013 | Xi | H04R 1/1016 381/374 |
| 2023/0388701 A1 * | 11/2023 | Struzik | H04R 1/025 |

* cited by examiner

*Primary Examiner* — Huyen D Le
(74) *Attorney, Agent, or Firm* — Wiersch Law Group

(57) ABSTRACT

An earphone core includes a frame, a vibration system, and a magnetic circuit system. The vibration system includes a vibrating diaphragm and a voice coil. The magnetic circuit system includes an inner magnetic gap and an outer magnetic gap. The vibrating diaphragm includes a first vibrating diaphragm and a second vibrating diaphragm. An outer periphery of the first vibrating diaphragm and an inner periphery of the second vibrating diaphragm are both fixed to the magnetic circuit system. The outer periphery of the second vibrating diaphragm is fixed to the frame. The voice coil includes a first voice coil and a second voice coil. The earphone core further includes a front cover. The front cover is fixed to the frame. The present disclosure further provides earphones. The earphone core and an earphone including the earphone core well broaden a frequency band.

10 Claims, 6 Drawing Sheets

B-B

(51) Int. Cl.

| | |
|---|---|
| ***H04R 7/18*** | (2006.01) |
| ***H04R 9/02*** | (2006.01) |
| ***H04R 9/06*** | (2006.01) |

B-B

EARPHONE CORE AND EARPHONE

TECHNICAL FIELD

The present disclosure relates to a field of electroacoustic conversion, and in particular to an earphone core and an earphone.

BACKGROUND

In recent years, with the rapid development of mobile communication technologies, consumers increasingly use mobile communication equipment having voice functions. Earphones further become one of the essential communication equipment in normal activities of people, and people not only require the earphones to be exquisite in appearance and convenient to take along, but also require the earphones to have good sound quality and stereoscopic sense. Therefore, further improving performance of the earphones and more reasonably designing an inner structure of the earphones have become a topic worth research.

The earphones in the related art each includes a housing, an earphone cover, and an earphone core. The earphone cover is matched with the housing to form an accommodating space, and the earphone core is fixedly disposed in the accommodating space. The earphone core includes a vibrating diaphragm, and the vibrating diaphragm is configured to vibrate to produce sound. Usually, the accommodating space is separated into a front sound cavity and a rear sound cavity through the vibrating diaphragm. A sound outlet is defined on the earphone cover, and the sound outlet is communicated with the front sound cavity. However, the earphones are only provided with two cavity structures, which limits a range of working frequency band of the earphones and cannot meet requirements of people for wide frequency bands, high sound quality, and multi sound effects.

Therefore, it is necessary to provide new earphones to solve above technical problems.

SUMMARY

The present disclosure aims to provide an earphone core and an earphone for widening a frequency band.

The present disclosure provides an earphone core, including a frame, a vibration system, and a magnetic circuit system. The vibration system and the magnetic circuit system are fixed to the frame. The vibration system includes a vibrating diaphragm and a voice coil. The magnetic circuit system includes an inner magnetic gap and an outer magnetic gap. The outer magnetic gap is defined around the inner magnetic gap. The vibrating diaphragm includes a first vibrating diaphragm and a second vibrating diaphragm. The second vibrating diaphragm is disposed around the first vibrating diaphragm. An outer periphery of the first vibrating diaphragm and an inner periphery of the second vibrating diaphragm are both fixed to the magnetic circuit system. The outer periphery of the second vibrating diaphragm is fixed to the frame. The voice coil includes a first voice coil and a second voice coil. The first voice coil is inserted into the inner magnetic gap and drives the first vibrating diaphragm to vibrate. The second voice coil is inserted into the outer magnetic gap and drives the second vibrating diaphragm to vibrate. The earphone core further includes a front cover. The front cover is fixed to the frame. The first vibrating diaphragm and the front cover are enclosed to form a first cavity. The second vibrating diaphragm and the front cover are enclosed to form a second cavity. The first cavity and the second cavity are separated. A first sound hole and a second sound hole penetrate through the front cover. The first sound hole is communicated with the first cavity. The second sound hole is communicated with the second cavity.

Furthermore, the magnetic circuit system includes a magnetic yoke, a permanent magnet, and a pole core. The magnetic yoke is fixed to the frame. The permanent magnet is disposed in the magnetic yoke and is spaced apart from the magnetic yoke to form the outer magnetic gap. The permanent magnet includes a first magnet and a second magnet. The second magnet is disposed on one side, facing away from the vibrating diaphragm, of the first magnet. The outer periphery of the first vibrating diaphragm and the inner periphery of the second vibrating diaphragm are both fixed to the first magnet. A first through hole penetrates through the first magnet. A second through hole penetrates through the second magnet. The pole core includes a wall portion and a plate portion. The wall portion is inserted into the first through hole. The wall portion is spaced apart from the first magnet to form the inner magnetic gap. The plate portion is connected to the wall portion. The plate portion is clamped between the first magnet and the second magnet.

Furthermore, a fixing frame is fixedly disposed on the first magnet. The outer periphery of the first vibrating diaphragm is fixed on an inner wall of the fixing frame. The front cover includes a surrounding wall. The surrounding wall abuts against one end, distal from the first magnet, of the fixing frame, so as to separate the first cavity and the second cavity.

Furthermore, the magnetic yoke includes a bottom wall and a side wall. The side wall extends from a periphery of the bottom wall towards a direction of the vibrating diaphragm. The side wall is fixed to the frame. The second magnet is fixedly disposed on the bottom wall. The side wall and the permanent magnet are spaced to form the outer magnetic gap.

Furthermore, the earphone core further includes a conductive component. The conductive component penetrates through the bottom wall. The conductive component is inserted into the first through hole and the second through hole. The conductive component is electrically connected to the second voice coil. The wall portion surrounds the conductive component.

Furthermore, the conductive component includes a main body portion and a conductive metal sheet. The conductive metal sheet is embedded in the main body portion. The conductive metal sheet is electrically connected to the second voice coil.

The present disclosure provides an earphone, including a housing, an earphone cover, and the earphone core as mentioned above. The earphone cover is matched with the housing to form an accommodating space. The earphone core is fixedly disposed in the accommodating space. The earphone cover covers the front cover of the earphone core. A sound outlet is defined on the earphone cover. The sound outlet is configured to communicate the first sound hole and the second sound hole with outside.

Furthermore, a resonant cavity is formed between the earphone cover and the front cover, and the resonant cavity is communicated with the first sound hole and the sound outlet.

Furthermore, the resonant cavity is recessed from one side, facing the earphone cover, of the front cover.

Furthermore, the sound outlet includes a first sound outlet and a second sound outlet, the first sound outlet is communicated with the resonant cavity and the outside, and the second sound outlet is communicated with the second sound hole and the outside.

Compared with the related art, the present disclosure provides the earphone core and the earphone, where the earphone core is a sound production structure combining two sound production vibrating diaphragms with two sound production cavities, thereby widening a range of the frequency band of the earphone.

DETAILED DESCRIPTION

Figure 1:
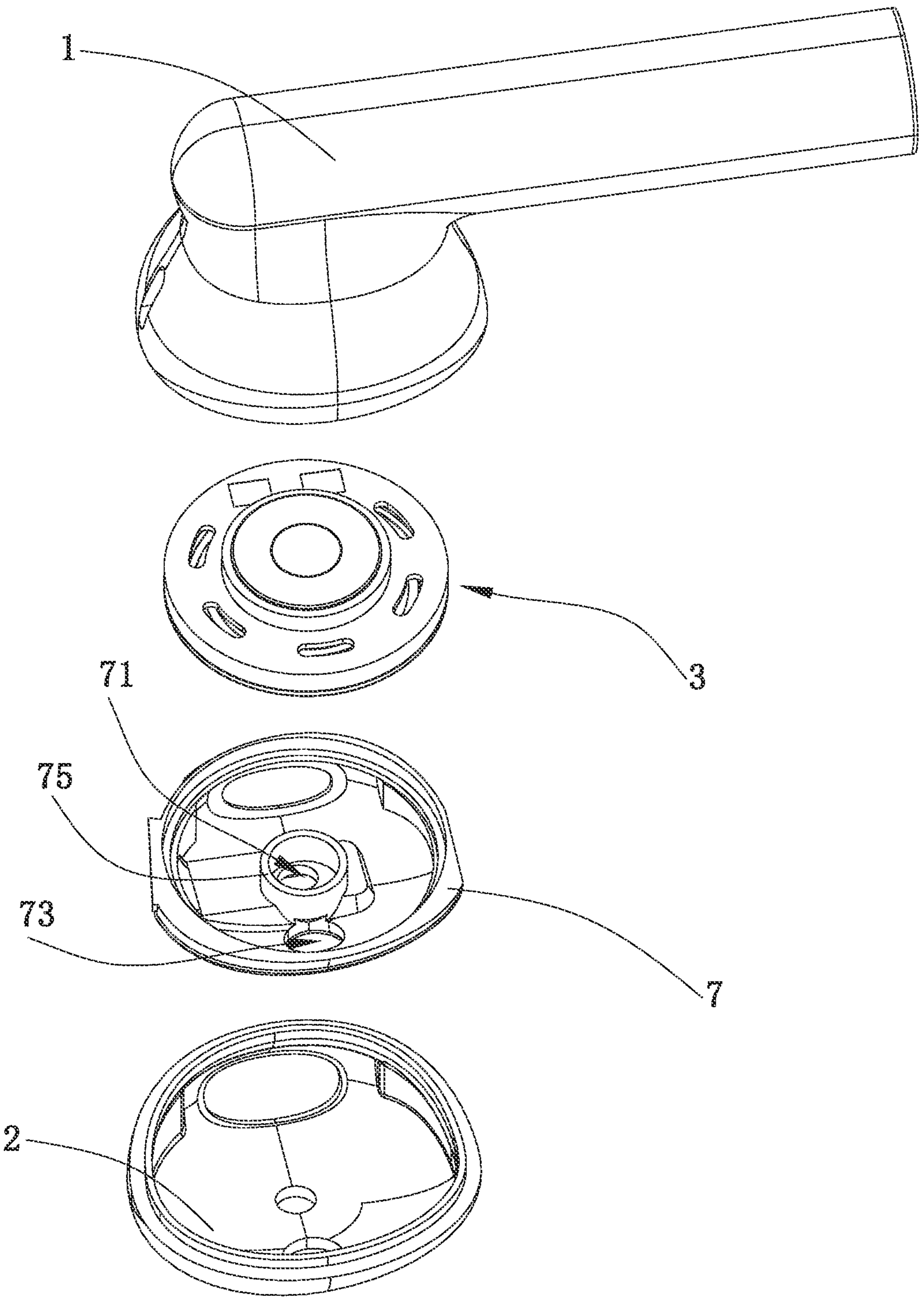
FIG. 1 is an exploded schematic diagram of an earphone according to one embodiment of the present disclosure.

Technical solutions in embodiments of the present disclosure are clearly and completely described below with reference to accompanying drawings in the embodiments of the present disclosure. Obviously, the described embodiments are only a part of the embodiments of the present disclosure, not all of the embodiments. Based on the embodiments of the present disclosure, all other embodiments obtained by a person of ordinary skill in art without creative efforts shall fall within a protection scope of the present disclosure.

Referring to FIGS. 1-6, the present disclosure provides an earphone, including a housing 1, an earphone cover 2, and an earphone core 3. The earphone cover 2 is matched with the housing 1 to form an accommodating space A. A sound outlet 21 is defined on the earphone cover 2. The earphone core 3 is fixedly disposed in the accommodating space A. Sound generated by the earphone core 3 is transmitted to outside through the sound outlet 21.

The earphone core 3 includes a frame 4, a vibration system 5, a magnetic circuit system 6, and a front cover 7. The vibration system 5, the magnetic circuit system 6, and the front cover 7 are fixed to the frame 4.

The vibration system 5 includes a vibrating diaphragm 51 and a voice coil 53, and the voice coil 53 drives the vibrating diaphragm 51 to vibrate to produce sound.

The vibrating diaphragm 51 includes a first vibrating diaphragm 511 and a second vibrating diaphragm 513. The second vibrating diaphragm 513 is disposed around the first vibrating diaphragm 511. An outer periphery of the first vibrating diaphragm 511 and an inner periphery of the second vibrating diaphragm 513 are both fixed to the magnetic circuit system 6. The outer periphery of the second vibrating diaphragm 513 is fixed to the frame 4.

The first vibrating diaphragm 511 and the front cover 7 are enclosed to form a first cavity B. A first sound hole 71 penetrates through the front cover 7, and the first sound hole 71 is communicated with the first cavity B.

The second vibrating diaphragm 513 and the front cover 7 are enclosed to form a second cavity C. A second sound hole 73 penetrates through the front cover 7, and the second sound hole 73 is communicated with the second cavity C.

The first cavity B and the second cavity C are separated. The earphone cover 2 covers the front cover 7. The first sound hole 71 and the second sound hole 73 are communicated with the outside through the sound outlet 21.

The voice coil 53 includes a first voice coil 531 and a second voice coil 533. The first voice coil 531 drives the first vibrating diaphragm 511 to vibrate. The second voice coil 533 drives the second vibrating diaphragm 513 to vibrate. Sound generated by vibration of the first vibrating diaphragm 511 is transmitted to the outside through the first cavity B, the first sound hole 71, and the sound outlet 21. Sound generated by vibration of the second vibrating diaphragm 513 is transmitted to the outside through the second cavity C, the second sound hole 73, and the sound outlet 21.

The first vibrating diaphragm 511 and the second vibrating diaphragm 513 are coaxially disposed. The first voice coil 531 and the second voice coil 533 are coaxially disposed. In this way, the vibration system 5 includes two vibration units coaxially disposed.

It should be noted that the sound generated by the vibration of the first vibrating diaphragm 511 has a first audio range, the sound emitted by the vibration of the second vibrating diaphragm 513 has a second audio range, so that combining the two sound production vibrating diaphragms with the two sound production cavities increases a range of frequency band of the earphone. In the embodiment, optionally, the first audio range is high-frequency audio, that is, the first vibrating diaphragm 511 provides high-frequency sound effects. The second audio range is low-frequency audio, that is, the second vibrating diaphragm 513 provides low-frequency sound effects.

In the embodiment, a resonant cavity D is formed between the earphone cover 2 and the front cover 7, and the resonant cavity D is communicated with the first sound hole 71 and the sound outlet 21. High-efficiency first audio frequency response output is provided by the resonant cavity D. For example, when the first vibrating diaphragm 511 provides the high-frequency sound effects, the resonant cavity D provides high-efficiency high-frequency response output.

Figure 4:
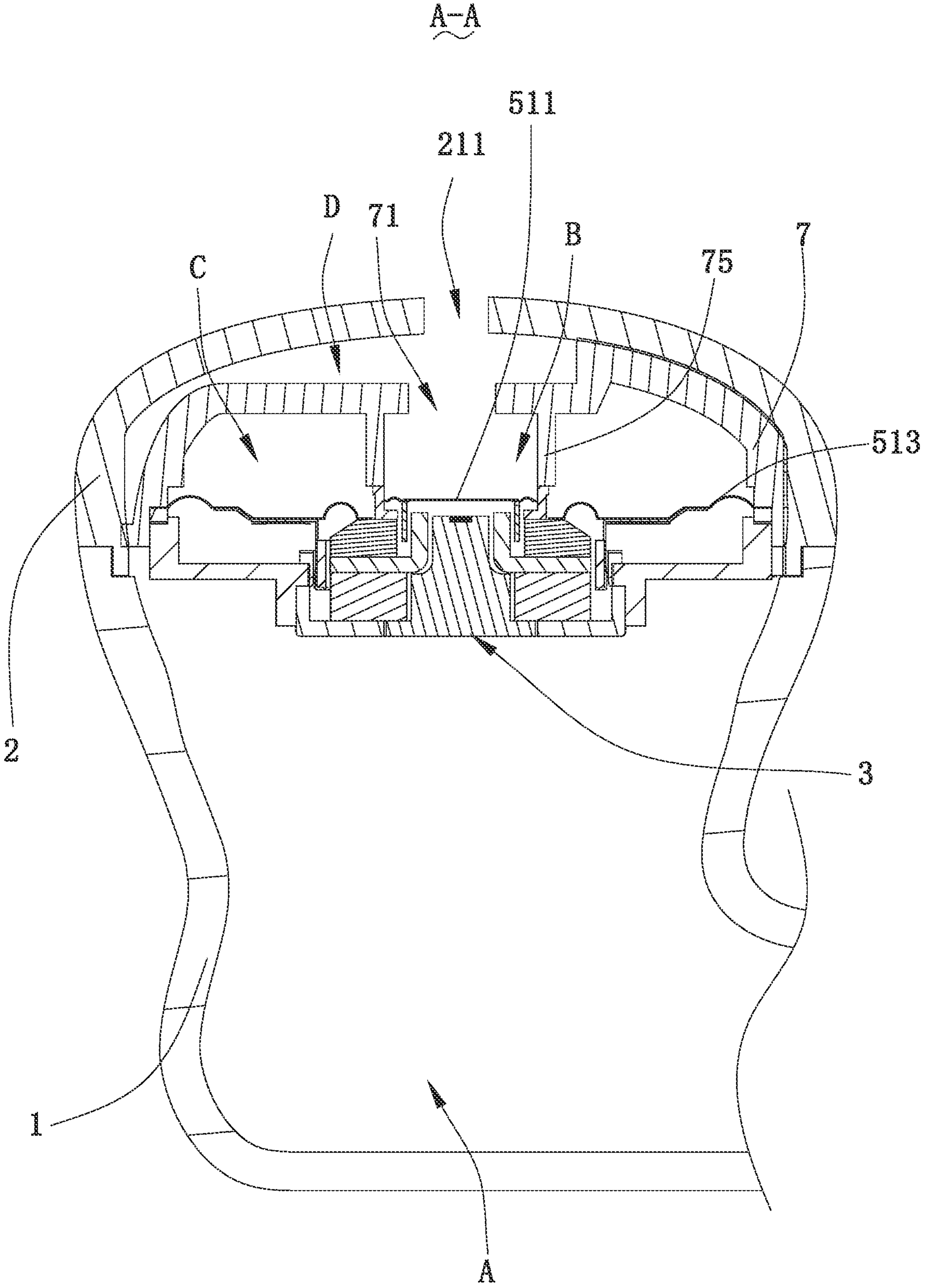
FIG. 4 is a cross-sectional schematic diagram of the earphone taken along the line A-A shown in FIG. 3.
Figure 5:
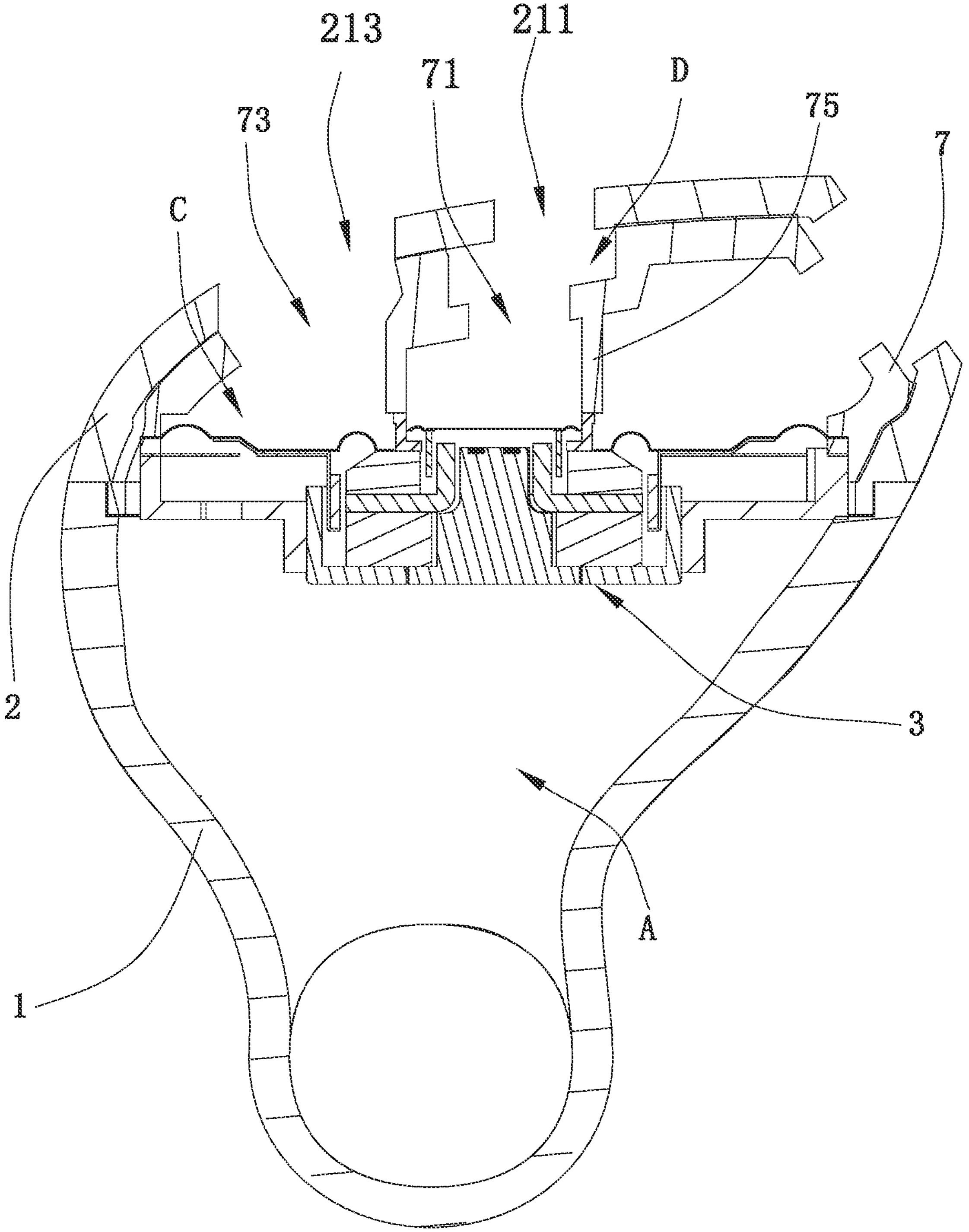
FIG. 5 is a cross-sectional schematic diagram of the earphone taken along the line B-B shown in FIG. 3.
Figure 6:
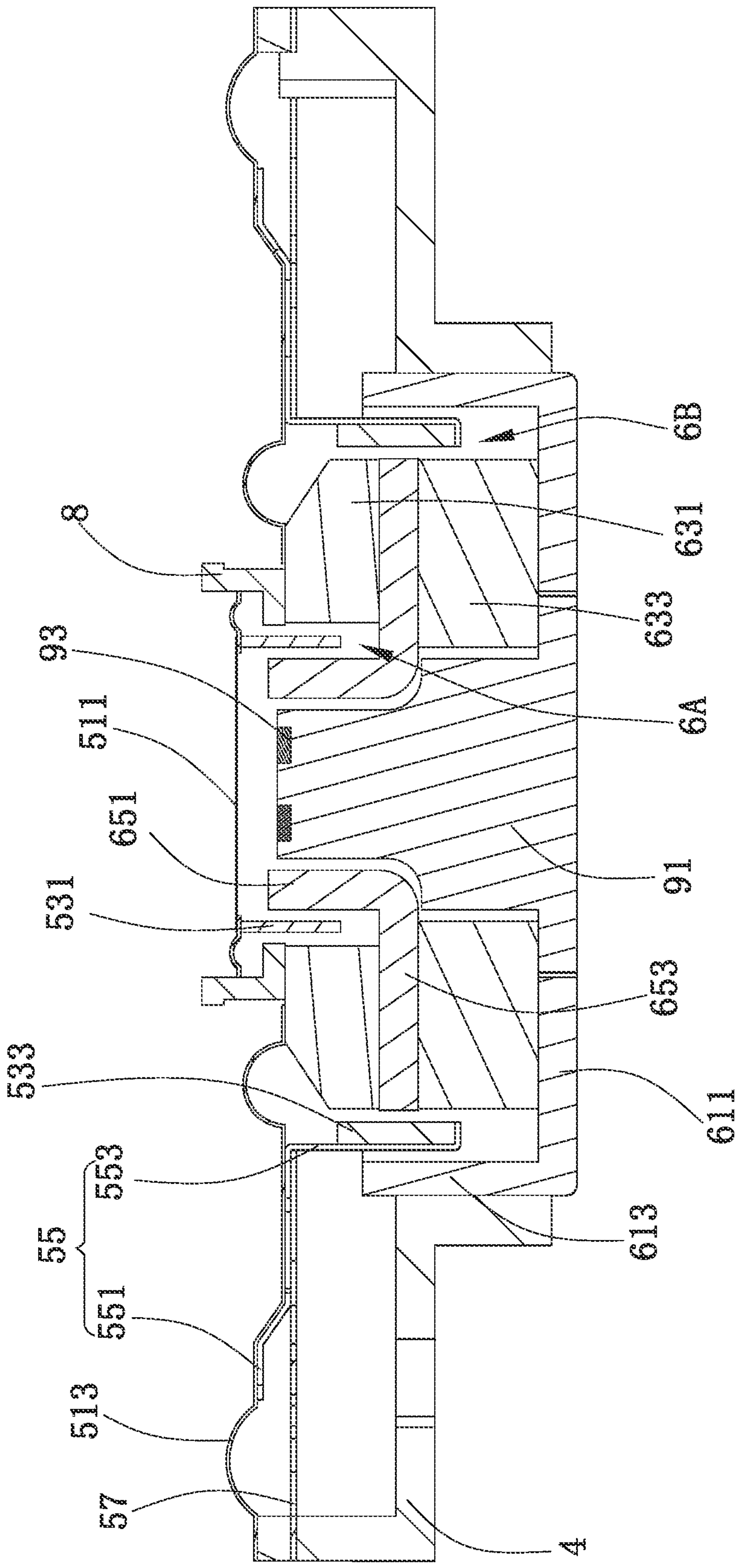
FIG. 6 is a structural schematic diagram of a partial structure of the earphone shown in FIG. 5.

As shown in FIGS. 4-5, the resonant cavity D is a long and narrow cavity. In the embodiment, optionally, the resonant cavity D is recessed from one side, facing the earphone cover 2, of the front cover 7. As such, the earphone cover 2 may be made of flexible materials, which improves comfort after earphones are inserted into ears of a person.

It should be noted that sound outlets of the first vibrating diaphragm 511 and the second vibrating diaphragm 513 are separated or overlapped, specifically, the sound outlets are defined according to appearance of the earphones and a length of the resonant cavity D.

Figure 3:
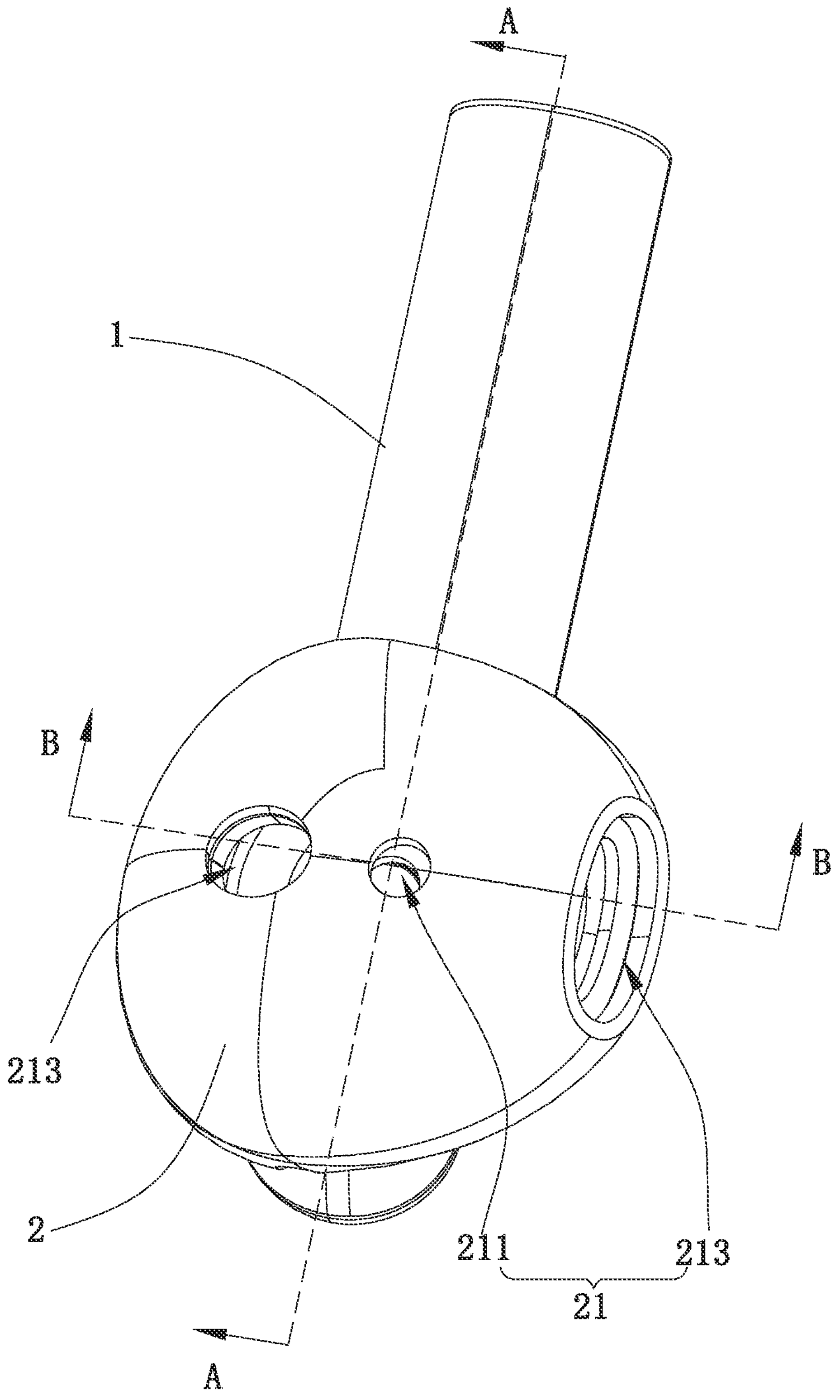
FIG. 3 is a structural schematic diagram of the earphone shown in FIG. 1, where the earphone is assembled.

As shown in FIG. 3 and FIG. 5, the sound outlet 21 includes a first sound outlet 211 and a second sound outlet 213, the first sound outlet 211 is communicated with the resonant cavity D and the outside, and the second sound outlet 213 is communicated with the second sound hole 73 and the outside.

In the embodiment, the vibration system 5 further includes a framework 55 and a flexible circuit board 57. The framework 55 includes a first fixing portion 551 and a second fixing portion 553. The first fixing portion 551 is fixed to the second vibrating diaphragm 513. The second fixing portion 553 is connected to the first fixing portion 551 and the second voice coil 533. The flexible circuit board 57 is fixed to one side, facing away from the second vibrating diaphragm 513, of the first fixing portion 551. The flexible circuit board 57 is electrically connected to the second voice coil 533.

The magnetic circuit system 6 includes an inner magnetic gap 6A and an outer magnetic gap 6B. The outer magnetic gap 6B is defined around the inner magnetic gap 6A. The first voice coil 531 is inserted into the inner magnetic gap 6A, and the second voice coil 533 is inserted into the outer magnetic gap 6B.

In the embodiment, the magnetic circuit system 6 includes a magnetic yoke 61, a permanent magnet 63, and a pole core 65. The magnetic yoke 61 is fixed to the frame 4. The permanent magnet 63 is disposed in the magnetic yoke 61 and is spaced apart from the magnetic yoke 61 to form the outer magnetic gap 6B.

The permanent magnet 63 includes a first magnet 631 and a second magnet 633. The second magnet 633 is disposed on one side, facing away from the vibrating diaphragm 51, of the first magnet 631. The outer periphery of the first vibrating diaphragm 511 and the inner periphery of the second vibrating diaphragm 513 are both fixed to the first magnet 631. A first through hole 632 penetrates through the first magnet 631. A second through hole 634 penetrates through the second magnet 633.

The pole core 65 includes a wall portion 651 and a plate portion 653. The wall portion 651 is inserted into the first through hole 632. The wall portion 651 is spaced apart from the first magnet 631 to form the inner magnetic gap 6A. The plate portion 653 is connected to the wall portion 651. The plate portion 653 is clamped between the first magnet 631 and the second magnet 633.

Figure 2:
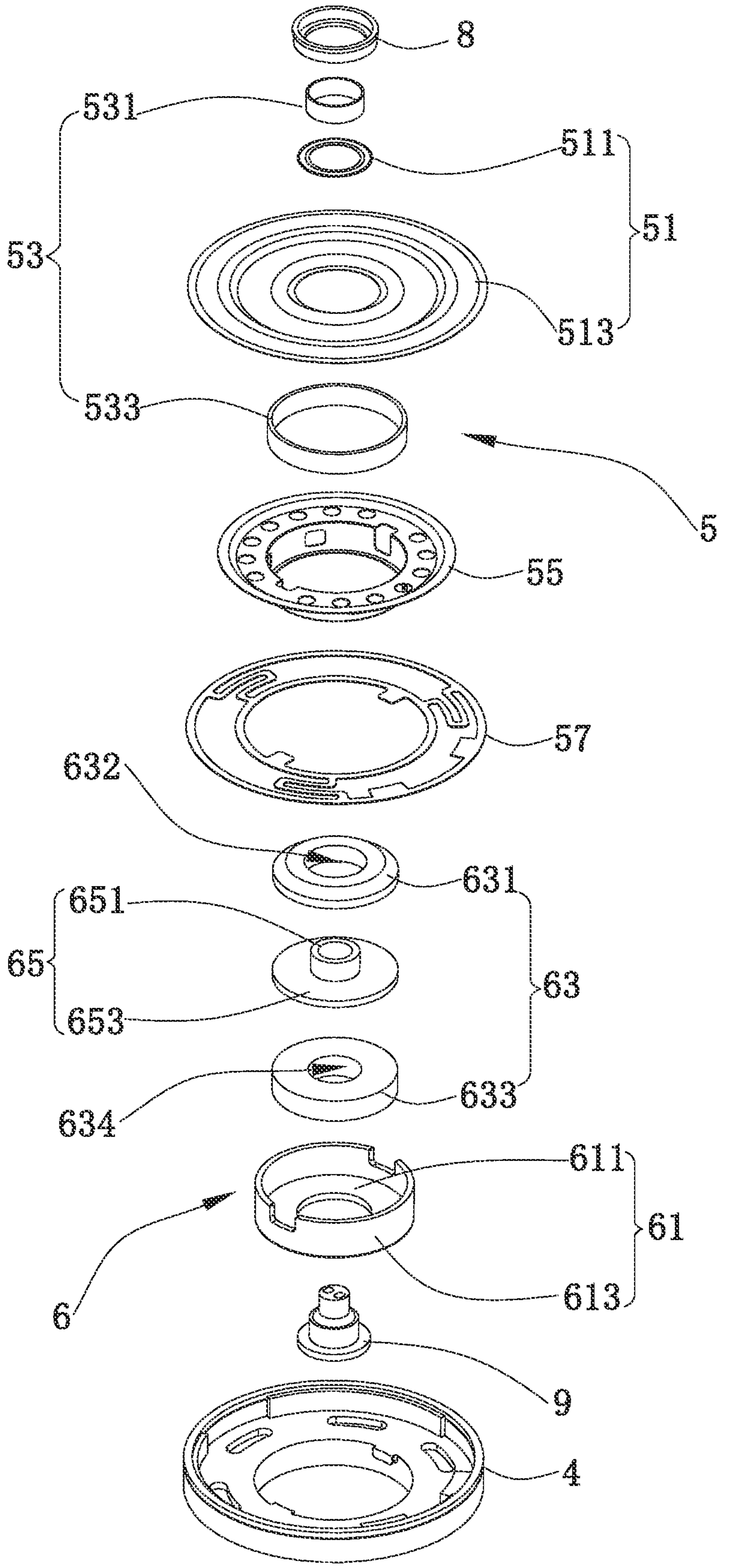
FIG. 2 is an exploded schematic diagram of a partial structure of an earphone core in the earphone shown in FIG. 1.

As shown in FIG. 2, the first magnet 631, the second magnet 633, and the wall portion 651 are all of continuous annular structures. It should be understood that, in other embodiments, the first magnet 631, the second magnet 633, and the wall portion 651 further have a plurality of split structures.

As shown in FIGS. 4-5, a fixing frame 8 is fixedly disposed on the first magnet 631. The outer periphery of the first vibrating diaphragm 511 is fixed on an inner wall of the fixing frame 8. The front cover 7 includes a surrounding wall 75. The surrounding wall 75 abuts against one end, distal from the first magnet 631, of the fixing frame 8, so as to separate the first cavity B and the second cavity C. That is, the first vibrating diaphragm 511 is indirectly fixed to the first magnet 631 through the fixing frame 8. Therefore, on one hand, a certain gap is formed between the first vibrating diaphragm 511 and the magnetic circuit system 6, so that the first vibrating diaphragm 511 has enough vibration space. On the other hand, a structure of avoiding vibration of the first vibrating diaphragm 511 on the first magnet 631 is avoided, so that the first magnet 631 has enough vibration space, and a volume of the first magnet 631 is increased to increase a magnetic field strength of the inner magnetic gap 6A and the outer magnetic gap 6B.

The magnetic yoke 61 includes a bottom wall 611 and a side wall 613. The side wall 613 extends from a periphery of the bottom wall 611 towards a direction of the vibrating diaphragm 51. The side wall 613 is fixed to the frame 4. The second magnet 633 is fixedly disposed on the bottom wall 611. The side wall 613 and the permanent magnet 63 are spaced to form the outer magnetic gap 6B.

In the embodiment, the earphone core 3 further includes a conductive component 9. The conductive component 9 penetrates through the bottom wall 611. The conductive component 9 is inserted into the first through hole 632 and the second through hole 634. The conductive component 9 is electrically connected to the second voice coil 533. The wall portion 651 surrounds the conductive component 9. It should be understood that, in other embodiments, the conductive component 9 may not be provided, and the second voice coil 533 is directly electrically connected to an external circuit through wires.

The conductive component 9 includes a main body portion 91 and a conductive metal sheet 93. The conductive metal sheet 93 is embedded in the main body portion 91. The conductive metal sheet 93 is electrically connected to the second voice coil 533.

The above are only the embodiments of the present disclosure. It should be noted that, for the person of ordinary skill in the art, improvements are made without departing from concepts of the present disclosure, but these are all within the protection scope of the present disclosure.

What is claimed is:

1. An earphone core, comprising:

a frame;

a vibration system; and a magnetic circuit system;

wherein the vibration system and the magnetic circuit system are fixed to the frame; the vibration system comprises a vibrating diaphragm and a voice coil; the magnetic circuit system comprises an inner magnetic gap and an outer magnetic gap, the outer magnetic gap is defined around the inner magnetic gap; the vibrating diaphragm comprises a first vibrating diaphragm and a second vibrating diaphragm, the second vibrating diaphragm is disposed around the first vibrating diaphragm, an outer periphery of the first vibrating diaphragm and an inner periphery of the second vibrating diaphragm are both fixed to the magnetic circuit system, and the outer periphery of the second vibrating diaphragm is fixed to the frame; the voice coil comprises a first voice coil and a second voice coil, the first voice coil is inserted into the inner magnetic gap and drives the first vibrating diaphragm to vibrate, and the second voice coil is inserted into the outer magnetic gap and drives the second vibrating diaphragm to vibrate; the earphone core further comprises a front cover, the front cover is fixed to the frame, the first vibrating diaphragm and the front cover are enclosed to form a first cavity, the second vibrating diaphragm and the front cover are enclosed to form a second cavity, and the first cavity and the second cavity are separated; a first sound hole and a second sound hole penetrate through the front cover, the first sound hole is communicated with the first cavity, and the second sound hole is communicated with the second cavity.

2. The earphone core according to claim 1, wherein the magnetic circuit system comprises a magnetic yoke, a permanent magnet, and a pole core; the magnetic yoke is fixed to the frame, the permanent magnet is disposed in the magnetic yoke and is spaced apart from the magnetic yoke to form the outer magnetic gap; the permanent magnet comprises a first magnet and a second magnet; the second magnet is disposed on one side, facing away from the vibrating diaphragm, of the first magnet; the outer periphery of the first vibrating diaphragm and the inner periphery of the second vibrating diaphragm are both fixed to the first magnet; a first through hole penetrates through the first magnet, a second through hole penetrates through the second magnet; the pole core comprises a wall portion and a plate portion, the wall portion is inserted into the first through hole, the wall portion is spaced apart from the first magnet to form the inner magnetic gap, the plate portion is connected to the wall portion, and the plate portion is clamped between the first magnet and the second magnet.

3. The earphone core according to claim 2, wherein a fixing frame is fixedly disposed on the first magnet, the outer periphery of the first vibrating diaphragm is fixed on an inner wall of the fixing frame, the front cover comprises a surrounding wall, and the surrounding wall abuts against one end, distal from the first magnet, of the fixing frame, so as to separate the first cavity and the second cavity.

4. The earphone core according to claim 2, wherein the magnetic yoke comprises a bottom wall and a side wall, the side wall extends from a periphery of the bottom wall towards a direction of the vibrating diaphragm, the side wall is fixed on the frame, the second magnet is fixedly disposed on the bottom wall, and the side wall and the permanent magnet are spaced to form the outer magnetic gap.

5. The earphone core according to claim 4, wherein the earphone core further comprises a conductive component, the conductive component penetrates through the bottom wall and is inserted into the first through hole and the second through hole, the conductive component is electrically connected to the second voice coil, and the wall portion surrounds the conductive component.

6. The earphone core according to claim 5, wherein the conductive component comprises a main body portion and a conductive metal sheet, the conductive metal sheet is embedded in the main body portion, and the conductive metal sheet is electrically connected to the second voice coil.

7. An earphone, comprising:

a housing;

an earphone cover; and the earphone core according to claim 1;

wherein the earphone cover is matched with the housing to form an accommodating space, the earphone core is fixedly disposed in the accommodating space, the earphone cover covers the front cover of the earphone core, a sound outlet is defined on the earphone cover, and the sound outlet is configured to communicate the first sound hole and the second sound hole with outside.

8. The earphone according to claim 7, wherein a resonant cavity is formed between the earphone cover and the front cover, and the resonant cavity is communicated with the first sound hole and the sound outlet.

9. The earphone according to claim 8, wherein the resonant cavity is recessed from one side, facing the earphone cover, of the front cover.

10. The earphone according to claim 8, wherein the sound outlet comprises a first sound outlet and a second sound outlet, the first sound outlet is communicated with the resonant cavity and the outside, and the second sound outlet is communicated with the second sound hole and the outside.

* * * * *